United States Patent [19]

Morgan

[11] 4,226,318
[45] Oct. 7, 1980

[54] HYDRAULICALLY ACTUATED CONE CLUTCH

[75] Inventor: George H. Morgan, South Bend, Ind.

[73] Assignee: Lambert Brake Corporation, St. Joseph, Mich.

[21] Appl. No.: 950,065

[22] Filed: Oct. 10, 1978

[51] Int. Cl.$^3$ .............................................. F16D 25/08
[52] U.S. Cl. ............................ 192/85 CA; 192/109 R
[58] Field of Search ............... 192/70.15, 70.14, 70.16, 192/70.19, 85 C, 85 CA, 109 R, 109 A, 85 AA, 85 R

[56] References Cited

U.S. PATENT DOCUMENTS

| | | | |
|---|---|---|---|
| 1,248,109 | 11/1917 | Heaney | 192/70.15 |
| 2,144,074 | 1/1939 | Maybach | 192/85 C |
| 2,578,308 | 12/1951 | Iavelli | 192/85 CA |
| 3,157,257 | 11/1964 | Root | 192/85 CA |
| 3,548,986 | 12/1970 | Fisher | 192/85 AA |

FOREIGN PATENT DOCUMENTS 523554 4/1931 Fed. Rep. of Germany ........ 192/70.15

*Primary Examiner*—George H. Krizmanich
*Attorney, Agent, or Firm*—Trexler, Wolters, Bushnell & Fosse, Ltd.

[57] ABSTRACT

An hydraulic clutch is provided, which is positively engaged by hydraulic means, and is disengaged by mechanical means. The clutch includes a male cone member carried for rotation on an input shaft, and for limited axial sliding movement therealong. Interconnection between the male cone member and the input shaft is provided by a series of elongated pins carried in recesses formed in the male cone member and in the input shaft. A female cone member, formed integrally with an output shaft, receives the male cone member for driving engagement. When engagement is desired, a fluid pressure piston and thrust plate urge the male cone member axially along the input shaft into driving engagement with the female cone member. A stop pin carried by the thrust plate engages an abutment for limiting the axial motion of the hydraulic piston and male cone member. When disengagement is desired, fluid pressure is released, and a resilient mechanical device such as a set of springs urges the male cone member out of engagement with the female cone member. A second mechanical device such as an additional set of springs returns the thrust plate and piston to their deactivated positions.

13 Claims, 2 Drawing Figures

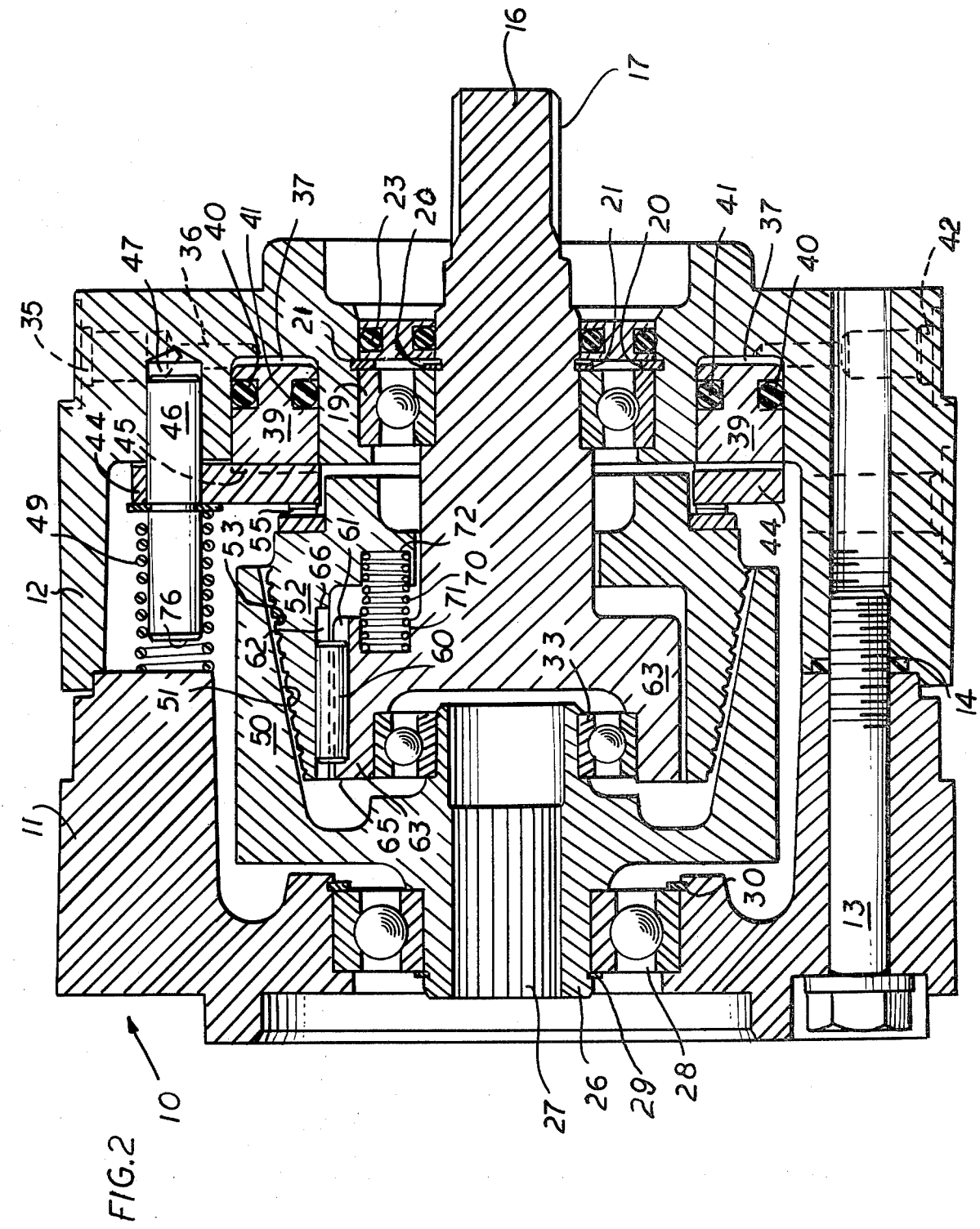

HYDRAULICALLY ACTUATED CONE CLUTCH

BACKGROUND OF THE INVENTION

This invention relates generally to clutches, and more particularly concerns cone clutches of the hydraulic type.

Cone clutches have found wide application in machinery where it may be desired to disengage one powered function while still driving a transmission or input shaft. Industrial drives of all sorts, particularly those having multiple output shafts, off-road vehicles and the like have utilized such clutches.

In the past, these cone clutches have usually been constructed so that they are engaged by operating some mechanical linkage mechanism, and have been disengaged by hydraulic means.

It is the general object of the present invention to provide a hydraulic clutch which is positively engaged by hydraulic means, and can be disengaged by mechanical means. An associated general object is to provide such a cone clutch which is inexpensive to manufacture, yet which is reliable and rugged in operation.

A more specific object is to provide such a cone clutch in which the number of parts required for complete assembly are minimized. It is a correlated object to provide a cone clutch in which the female cone member and the output shaft member are fabricated as one, unitary, single piece.

Another object is to provide a cone clutch which includes means for positively urging apart the mating cone clutch members when disengagement is desired. An associated object is to provide such a cone clutch in which a sliding cone member is slidably connected to one shaft (here, the input shaft) by an inexpensive yet reliable and rugged mechamism.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 2 is a sectional view taken substantially in the planes of line 2—2 in FIG. 1.

DETAILED DESCRIPTION

Figure 1:
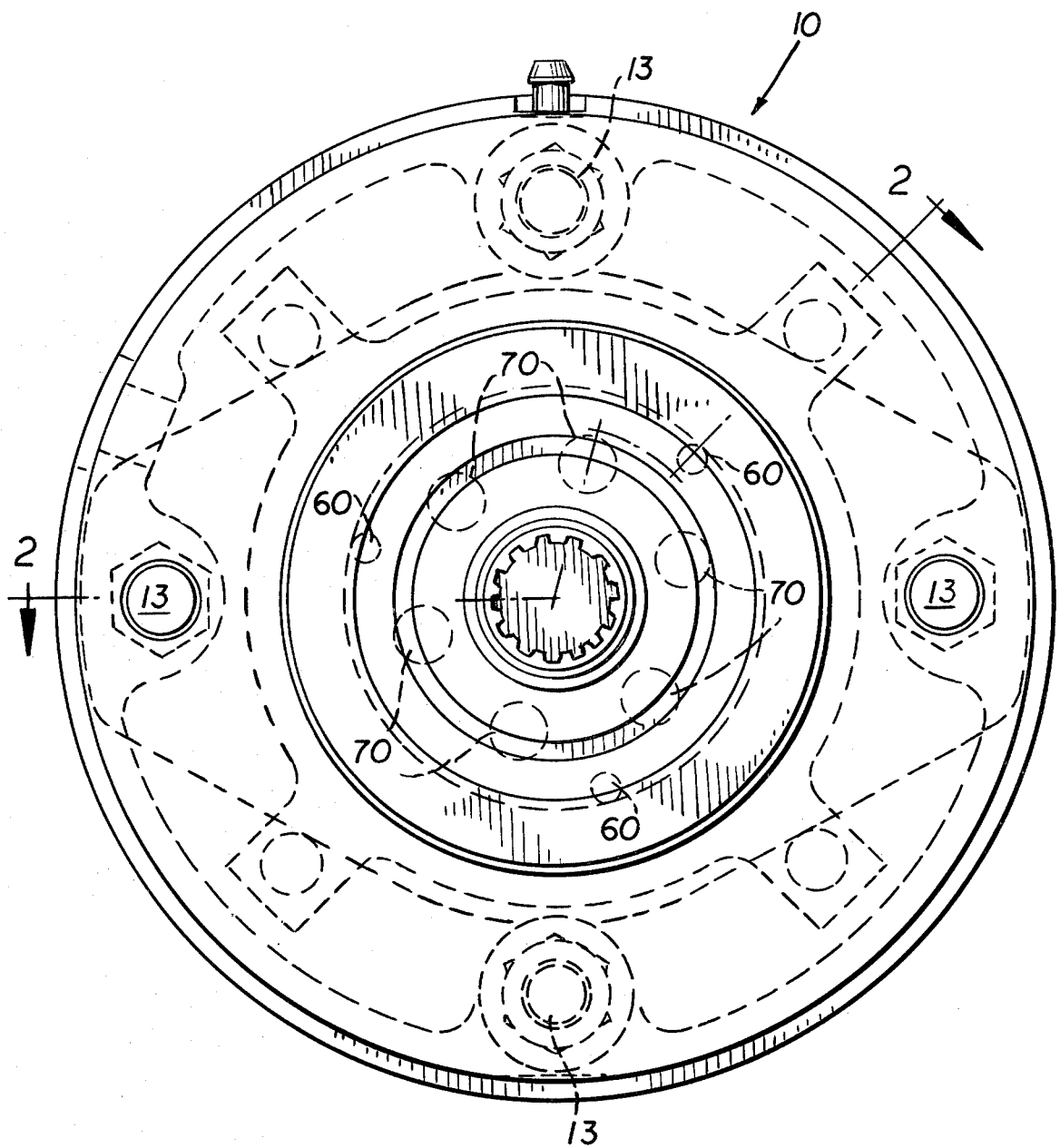
FIG. 1 is an end elevational view of a clutch embodying the present invention.

While the invention will be described in connection with a preferred embodiment, it will be understood that it is not intended to limit the invention to this embodiment. On the contrary, it is intended to cover all alternatives, modifications, and equivalents as may be included within the spirit and scope of the invention as defined by the appended claims.

Turning more specifically to the drawings, there is shown a clutch 10 embodying the present invention. Viewed generally, this clutch 10 includes mating housing members 11 and 12 secured together by bolts 13. Fluid leakage around the bolts 13 and between the housing members 11 and 12 can be prevented by suitably-sized and installed O-rings 14.

Protruding from the clutch unit 10 is an input shaft 16, the end of which is here provided with splines 17 for connection to a suitable drive device (not shown). An appropriate ball or other bearing 19 journals the shaft 16 within one member 12 of the housing. Snap rings 20 and 21 secure one portion of the bearing assembly 19 within the housing 12 and the shaft 16 to another part of the bearing 19. A seal member 23 of suitable design discourages fluids within the clutch 10 from leaking out, and bars the ingress of dirt or other foreign matter.

At the other end of the clutch 10, an output shaft 26 is provided with a splined female recess 27 which can be connected to a transmission or like structure to be driven so that the transmission and the clutch can, if desired, have a common oil circulatory system. This output shaft 26 is journalled upon the housing member 11 by a suitable bearing assembly 28. A snap ring 29 secures one portion of the bearing 28 to the output shaft 26; a similar snap ring 30 secures another portion of the bearing 28 to the stationary housing member 11. To provide a compact unit, and to reduce the number of parts required in the clutch mechanism, a third, internal bearing assembly 33 insures that the input shaft 16 and the output shaft 26 are axially aligned, provides additional bearing support to both shafts 16 and 26, and permits the input shaft 16 to rotate freely yet independently of the output shaft 26 when desired.

In accordance with the invention, a positive, hydraulically actuated system is provided for engaging the clutch and causing the output shaft 26 to rotate together with the input shaft 16. When clutch operation is desired—that is, when an operator wishes to transmit rotary motion from the input shaft 16 to the output shaft 26—suitably pressurized fluid is introduced to an input port 35 and is directed, by one or more appropriate passages 36, to an annular hydraulic chamber 37. This fluid forces an annular piston 39 outwardly, or, as illustrated in FIG. 2, to the left. Fluid leakage from the chamber 37 around the piston 39 can be prevented by suitable O-rings 40 and 41. A suitably plugged drain 42 permits fluid to be drained from the chamber 37 for servicing.

In accordance with another aspect of the invention, positive, fail-safe type mechanical means are provided for urging the clutch into a disengaged position. To accomplish this, it will be noted that the above-discussed outward or leftward motion of the piston 39 has caused similar leftward motion to an annular thrust plate 44. Oil circulation grooves 45 encourage good lubrication throughout adjacent portions of the clutch. Precision in thrust plate motion is provided by mounting the thrust plate 44 upon a series of pins 46 carried for reciprocation in mating bores 47 formed in the housing member 12. Pre-compressed coil springs 49 surround a portion of the pin, and abut a stationary member such as the opposite housing member 11. Thus, when the positive hydraulic pressure experienced in the hydraulic chamber 37 is released, the action of the return springs 49 urges the thrust plate 44 and the hydraulic piston 39 to the right, as shown in FIG. 2, and back into their respective inactive, clutch-disengaged positions.

Alternatively, a series of spot-type pistons can be provided in place of the annular piston 39. Preferably, these spot pistons are equiangularly spaced about the input shaft 16 so as to provide a uniform pressure against the annular thrust bearing plate 44.

A female clutch member 50 is provided with a conically shaped annular inner surface 51. It will be noted that, in accordance with yet another aspect of the invention, this female clutch member 50 is formed as an integral, single piece with the output shaft 26 so as to lower the cost of clutch manufacturing.

A mating, male clutch member 52 is provided with a suitably grooved or otherwise finished annular outer surface 53 adapted for mating with the female clutch surface 51. This male cone member 52 is secured upon the input shaft 16 for rotation therewith, but is permitted limited axial motion relative thereto. To urge the male cone member 52 into driving engagement with the female clutch member 50, a roller bearing mechanism 55 or other suitable device is interposed between the non-rotating thrust plate 44 and the rotating male cone member 52. This device transmits axial engagement or leftward motion of the piston 39 and thrust plate 44 to the male cone member 52 and urges the male cone member 52 likewise to the left as viewed in FIG. 2.

In accordance with still another aspect of the invention, this cone member 52 is caused to rotate with the input shaft 16, but is permitted limited axial motion relative thereto by an inexpensive, yet reliable and rugged device. Here, the cone member-shaft interconnector takes the form of a series of cylindrical spline pins 60 which are carried in mating grooves of semi-circular cross-sectional aspect 61 formed in a radially extending mounting flange 63 of the input shaft 16, and similar grooves 62 of semi-circular cross-sectional aspect are formed in the male cone member 52. An abutment 65 is formed at the tip of the input shaft 16 to prevent excessive pin motion to the left as viewed in FIG. 2; a similar abutment 66 is formed at the opposite end of each groove 62 in the male member cone member 52 to prevent excessive pin motion in the opposite direction. Thus, these pins 60 key the male cone member 52 to the input shaft 16, but permit limited relative axial motion. This arrangement is of surprisingly reliable and rugged construction; yet it is relatively inexpensive and permits the transfer of large amounts of torque from the input shaft 16 to the output shaft 26 without damage or destruction. In the illustrated embodiment, three such pins 60 are provided at equiangularly spaced positions about the circumference of the shaft flange 63, as can be envisioned from FIG. 1.

In carrying out the invention, the clutch is positively returned to a clutch-deenergized or deactivated position by positive mechanical means. Here, a series of equiangularly spaced resilient coil spring members 70 are received in opposing wells 71 and 72 formed in the input shaft flange 63 and in the male cone member 52, respectively. When hydraulic pressure is released, these pre-compressed springs 70 axially expand, forcing the male cone member 52 to the right and out of engagement with the female cone portion 50 of the output shaft 26.

It will be noted that the stop pin 46 is provided with a nose 76 of pre-determined length for abutment against the opposite housing member 11 so as to limit the travel of the pin 46, and consequently limit the amount of engagement motion which can be imparted by the piston 39 via the thrust plate 44 and to the male cone member 52. In this way, the male cone member 52 can be pushed firmly into driving engagement with the female cone member 50, but excessive axial motion and force is not imparted to the output shaft 26, and damage to the clutch unit bearings or other associated parts is avoided.

The invention is claimed as follows:

1. An hydraulic clutch comprising, in combination, an input shaft, a male cone member, interconnector means mounting said male cone member on the input shaft for rotation therewith and for limited axial sliding movement therealong, a female cone member having an open end for receiving the input shaft and male cone member, the female cone member having a conically-shaped, annular wall surrounding the male cone member, and also including a portion shaped to form an output shaft, fluid pressure means including at least one slidable piston for applying sufficient axial pressure to the male cone member to urge the male cone member into engagement with the female cone member, and bearing means for transferring the piston motion to the rotatable male cone member, thereby drivingly coupling the input and output shafts, and means for separating the cone members when the fluid pressure is released.

2. An hydraulic clutch according to claim 1 including thrust plate means interposed between said hydraulic piston and said male cone member.

3. An hydraulic clutch according to claim 1 in which said female cone member and said output shaft are formed integrally as a single piece.

4. An hydraulic clutch according to claim 1 wherein said mechanical separating means includes resilient means for urging the piston into an inactive clutch-disengaged position.

5. An hydraulic clutch according to claim 1 wherein said mechanical separating means includes resilient means interposed between said input shaft and said male cone member for urging the male cone member axially along the input shaft out of engagement with said female cone member.

6. An hydraulic clutch according to claim 1 wherein said interconnector means includes a plurality of elongated pin members, and wherein said input shaft and said cone member each defines recesses for receiving the elongated pin members.

7. An hydraulic clutch according to claim 6 including stop abutment means on said input shaft to limit motion of said elongated pin members relative to said input shaft in the first direction.

8. An hydraulic clutch according to claim 6 including stop abutment means on said male cone member to limit motion of said elongated pin members relative to said male cone member in a second direction.

9. An hydraulic clutch comprising an input shaft, a first cone member mounted for rotation on said input shaft and for axial sliding motion therealong, an output shaft coaxial with the input shaft and carrying a second cone member adapted for driving engagement with the first cone member, and coupling means for drivingly coupling the cone members, said coupling means including a piston movable in one direction for applying axial force to one cone member, a stop pin mounted for motion with the piston, a stop abutment for limiting the movement of the stop pin and piston, and a return spring for applying force to move the piston toward a clutch-disengaged position.

10. An hydraulic clutch according to claim 9 including resilient means interposed between said input shaft and said first cone member for urging the first cone member axially along the input shaft out of engagement with the second cone member.

11. An hydraulic clutch according to claim 9 further comprising an interconnector means for interconnecting the input shaft and the first cone member, the interconnector means including a plurality of elongated pin members, and wherein said input shaft and said first cone member each define recesses for receiving these elongated pin members.

12. An hydraulic clutch comprising coaxial first and second shafts, driving and driven clutch cone members respectively coupled to said first and second shafts, fluid power means including a translatably movable piston for urging one cone member into driving engagement with the other cone member, bearing means for transferring piston motion to said one cone member, one of the members being integrally formed with one of the shafts, mechanical means including a resilient element for urging the cone members apart from one another, and a housing forming a chamber containing the cones, the piston, the resilient element and at least part of each of said shafts.

13. An hydraulic clutch according to claim 12 including a resilient mechanical element for urging the piston into a clutch-disengaged position.

* * * * *